United States Patent
Wutte

(10) Patent No.: US 6,792,409 B2
(45) Date of Patent: Sep. 14, 2004

(54) SYNCHRONOUS REPRODUCTION IN A SPEECH RECOGNITION SYSTEM

(75) Inventor: Heribert Wutte, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 653 days.

(21) Appl. No.: 09/741,671

(22) Filed: Dec. 19, 2000

(65) Prior Publication Data

US 2001/0018653 A1 Aug. 30, 2001

(30) Foreign Application Priority Data

Dec. 20, 1999 (EP) .............................. 99204400

(51) Int. Cl.⁷ .............................................. G10L 21/00
(52) U.S. Cl. ...................................... 704/276; 704/277
(58) Field of Search .............................. 704/256, 251, 704/276, 277

(56) References Cited

U.S. PATENT DOCUMENTS

| | | | | |
|---|---|---|---|---|
| 4,748,670 A | * | 5/1988 | Bahl et al. .................. | 704/256 |
| 4,907,274 A | * | 3/1990 | Nomura et al. .............. | 380/30 |
| 5,031,113 A | | 7/1991 | Hollerbauer ............ | 364/513.5 |
| 5,199,077 A | * | 3/1993 | Wilcox et al. .............. | 704/256 |
| 5,649,060 A | * | 7/1997 | Ellozy et al. ............... | 704/278 |
| 5,677,835 A | * | 10/1997 | Carbonell et al. ............. | 704/8 |
| 5,729,741 A | * | 3/1998 | Liaguno et al. .......... | 707/104.1 |
| 5,850,629 A | * | 12/1998 | Holm et al. ................ | 704/260 |
| 5,857,099 A | | 1/1999 | Mitchell et al. ............. | 794/235 |
| 5,949,952 A | * | 9/1999 | Bennett et al. ............... | 386/46 |
| 5,960,447 A | | 9/1999 | Holt et al. ................... | 707/500 |
| 5,970,460 A | * | 10/1999 | Bunce et al. ............... | 704/278 |
| 5,995,936 A | * | 11/1999 | Brais et al. ................. | 704/275 |
| 6,064,965 A | * | 5/2000 | Hanson ...................... | 704/275 |
| 6,181,351 B1 | * | 1/2001 | Merrill et al. .............. | 345/473 |
| 6,611,802 B2 | * | 8/2003 | Lewis et al. ................ | 704/235 |

OTHER PUBLICATIONS

"Speech Processing and Stenographying System for Lithuanian Parliament" Database accession No. 6219833, XP0021600789, Abstract.

* cited by examiner

Primary Examiner—Vijay Chawan
Assistant Examiner—Michael N. Opsasnick
(74) Attorney, Agent, or Firm—John Vodopia

(57) ABSTRACT

In a speech recognition system, the received speech and the sequence of words, recognized in the speech by a recognizer (100), are stored in a memory (320, 330). Markers are stored as well, indicating a correspondence between the word and a segment of the received signal in which the word was recognized. In a synchronous reproduction mode, a controller (310) ensures that the speech is played-back via speakers (350) and that for each speech segment a word, which has been recognized for the segment, is indicated (e.g. highlighted) on a display (340). The controller (310) can detect whether the user has provided an editing instruction, while the synchronous reproduction is active. If so, the synchronous reproduction is automatically paused and the editing instruction executed.

18 Claims, 2 Drawing Sheets

SYNCHRONOUS REPRODUCTION IN A SPEECH RECOGNITION SYSTEM

The invention relates to a system and method for reviewing a text recognized by a speech recognizer.

U.S. Pat. No. 5,031,113 describes a speech recognition system used for dictation. The system enables a user to review the recognized text in a so-called synchronous reproduction mode. After the user has finished dictating, the user can enter the synchronous reproduction mode. In this mode, the speech of the user is played-back while at the same time the word, which was recognized for the segment of speech being played-back, is highlighted on the display. To this end, the speech of the user has been stored in a memory. Moreover, during the recognition, word boundaries are detected in the speech. For each word a begin mark, indicating the beginning of the word, and an end mark, indicating the end of the word, are stored. This enables an accurate synchronous reproduction of the speech and the highlighting on the display. If the user detects that a word has been recognized wrongly (or the user wants to change/add/delete a word for another reason), the user can stop the synchronous reproduction and enter the editing and/or dictation mode. The user may enter the synchronous reproduction mode at any point in the text.

In itself the synchronous reproduction has been found to be beneficial to the user for correcting recognition mistakes. However, the modal behavior of the system reduces its effectiveness, since correction of a word requires too many actions of the user with respect to changing mode of the system.

It is an object of the invention to overcome above-mentioned drawback.

To meet the object of the invention, a speech recognition system includes: a speech recognition system comprising:
  an input for receiving a speech representative signal;
  a first memory for storing a representation of the received signal suitable for audible reproduction;
  a speech recognizer operative to represent the received signal as a sequence of recognized words;
  a second memory for storing the sequence of recognized words, where each recognized word is stored in association with a marker indicating a correspondence between the word and a segment of the received signal in which the word was recognized;
  a controller operative to enable a user to review at least part of the sequence of recognized words by causing a synchronous reproduction of an audible and visible representation of the part of the sequence of recognized words, the synchronous reproduction including audibly reproducing a corresponding part of the received signal stored in the first memory and for each segment of the corresponding part of the received signal, at the moment when the segment is being audibly reproduced, indicating on a display a textual representation of a recognized word which corresponds to the segment; the correspondence being given by the markers stored in the second memory; to detect whether the user has provided an editing instruction, while the synchronous reproduction is active; and to pause the synchronous reproduction in response to having detected an editing instruction during the synchronous reproduction, and cause the editing instruction to be performed.

Once the user has completed a dictation, it is sufficient to once enter the synchronous reproduction mode. While effectively staying in the synchronous reproduction mode the user can edit the recognized text. The editing instructions of the user may be received via any suitable form of input, including the keyboard (e.g. to insert/delete/replace a word or character(s) of a word), the mouse (e.g. to change formatting of a part of the text, like changing font, style or size, or to change an edit position), or via voice (e.g. to dictate one or more words/characters to insert/delete/replace a word or character(s) of a word or in the form of a voice command e.g. to change formatting of a part of the text or to change an edit position). It is no longer required that the user issues a dedicated instruction to leave the synchronous reproduction mode to be able to edit the text.

Restart of the synchronous reproduction may be automatic, i.e., the user no longer needs to issue an explicit dedicated instruction to re-start the synchronous reproduction.

The synchronous may be automatically restarted after the user apparently has finished the editing which may be detected when the user has not provided editing input for a certain period of time. In a preferred embodiment, the time-out is user-configurable providing the user a choice between the system quickly restarting the synchronous reproduction (with the risk that the user was still considering further editing operations) and the system restarting the synchronous reproduction more slowly (allowing the user more time to edit, at the expense of an overall slower response). Preferably, the user can still overrule the automatic behavior via an explicit instruction to stop a restarted reproduction which restarted too quickly or to restart a restarting reproduction which restarted too slowly. The default time-out may be in the order of a few hundred milliseconds to a few seconds.

The reproduction may be restarted where it was paused. This will, in normal situations, allow for a smooth continuation of the reviewing.

If the user has edited one or more words, the reproduction may be restarted at the last edited word. In most situations, this position reflects the area of interest of the user, making it desired to restart the reproduction from that position.

In one embodiment, the user can simply change where in the sequence of recognized words the reproduction is active by indicating the desired position, e.g., by clicking the mouse at the desired position or via voice commands.

The the system is capable of dealing with those situations where the user wants to restart the dictation at the position currently reached in the reproduction mode. According to the invention, if the user simply starts his dictation by speaking (e.g., several seconds), the system no longer regards the voice input as being intended to edit (e.g., insert) a few words into the existing dictation, but instead exits the reproduction mode and goes into the dictation mode.

To meet the object of the invention, a method of enabling reviewing a sequence of words recognized by a speech recognizer in a speech representative input signal includes the steps of:
  storing a representation of the received signal suitable for audible reproduction;
  using a speech recognizer to represent the received signal as a sequence of recognized words;
  storing the sequence of recognized words, where each recognized word is stored in association with a marker indicating a correspondence between the word and a segment of the received signal in which the word was recognized;
  enabling a user to review at least part of the sequence of recognized words by causing a synchronous reproduction of an audible and visible representation of the part of the sequence of recognized words, the synchronous reproduction including audibly reproducing a corresponding part of the received signal stored in the first memory and for each segment of the corresponding part of the received signal, at the moment when the segment is being audibly reproduced, indicating on a display a textual representation of a recognized word which corresponds to the segment; the correspondence being given by the markers stored in the second memory;

detecting whether the user has provided an editing instruction, while the synchronous reproduction is active; and pausing the synchronous reproduction in response to having detected an editing instruction during the synchronous reproduction, and causing the editing instruction to be performed.

These and other aspects of the invention will be apparent from and elucidated with reference to the embodiments shown in the drawings.

Figure 1:
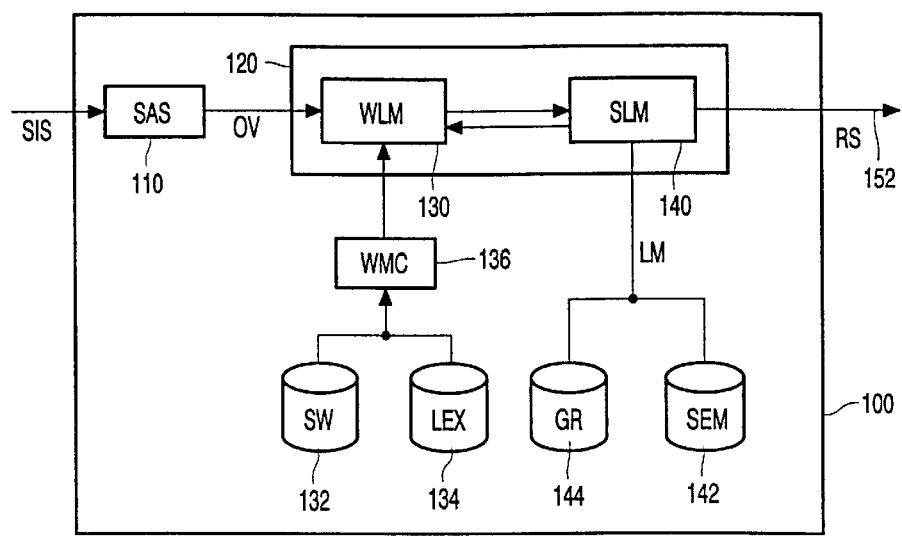
FIG. 1 shows the elements of a typical speech recognizer.

Speech recognition systems, such as large vocabulary continuous speech recognition systems, typically use a collection of recognition models to recognize an input pattern. For instance, an acoustic model and a vocabulary may be used to recognize words and a language model may be used to improve the basic recognition result. FIG. 1 illustrates a typical structure of a large vocabulary continuous speech recognition system 100. The system 100 comprises a spectral analysis subsystem 110 and a unit matching subsystem 120. In the spectral analysis subsystem 110 the speech input signal (SIS) is spectrally and/or temporally analyzed to calculate a representative vector of features (observation vector, OV). Typically, the speech signal is digitized (e.g. sampled at a rate of 6.67 kHz.) and preprocessed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. The standard approach to large vocabulary continuous speech recognition is to assume a probabilistic model of speech production, whereby a specified word sequence $W=w_1w_2w_3 \ldots w_q$ produces a sequence of acoustic observation vectors $Y=y_1y_2y_3 \ldots y_T$. The recognition error can be statistically minimized by determining the sequence of words $w_1w_2w_3 \ldots w_q$ which most probably caused the observed sequence of observation vectors $y_1y_2y_3 \ldots y_T$ (over time $t=1, \ldots, T$), where the observation vectors are the outcome of the spectral analysis subsystem 110. This results in determining the maximum a posteriori probability:

max $P(W|Y)$, for all possible word sequences W

By applying Bayes' theorem on conditional probabilities, $P(W|Y)$ is given by:

$P(W|Y)=P(Y|W).P(W)/P(Y)$

Since P(Y) is independent of W, the most probable word sequence is given by:

arg max $P(Y|W).P(W)$ for all possible word sequences W (1)

In the unit matching subsystem 120, an acoustic model provides the first term of equation (1). The acoustic model is used to estimate the probability $P(Y|W)$ of a sequence of observation vectors Y for a given word string W. For a large vocabulary system, this is usually performed by matching the observation vectors against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. In most small vocabulary speech recognition systems, a whole word is represented by a speech recognition unit, in which case a direct relationship exists between the word model and the speech recognition unit. In large vocabulary systems, as normally used for dictation applications, use can be made of linguistically based sub-word units, such as phones, diphones or syllables, as well as derivative units, such as fenenes and fenones. For such systems, a word model is given by a lexicon 134, describing the sequence of sub-word units relating to a word of the vocabulary, and the sub-word models 132, describing sequences of acoustic references of the involved speech recognition unit. A word model composer 136 composes the word model based on the subword model 132 and the lexicon 134.

Figure 2A:
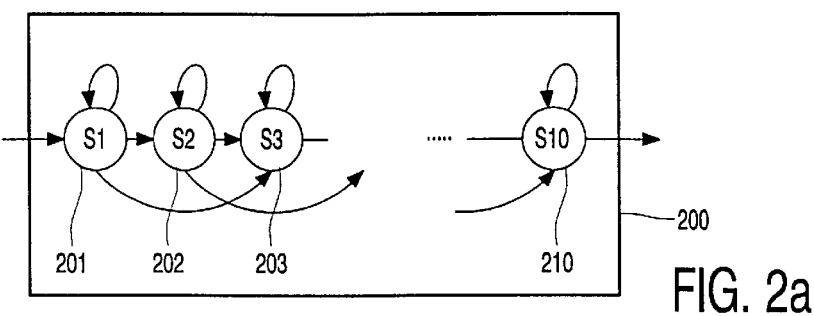
FIG. 2 illustrates HMM-based word models.
Figure 2B:
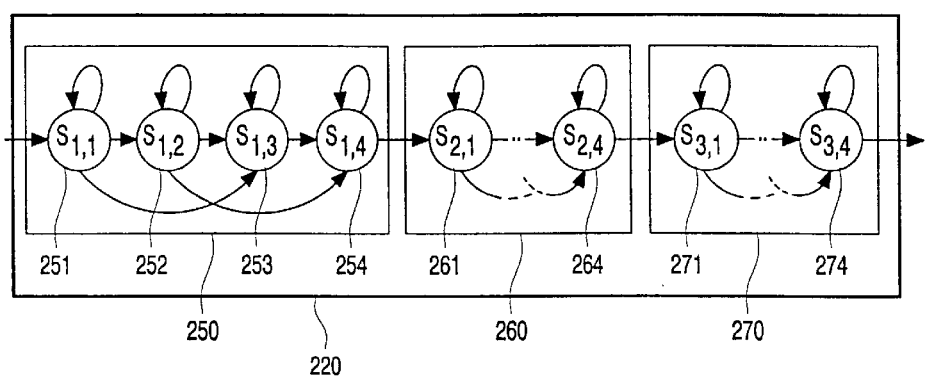

FIG. 2A illustrates a word model 200 for a system based on whole-word speech recognition units, where the speech recognition unit of the shown word is modeled using a sequence of ten acoustic references (201 to 210). FIG. 2B illustrates a word model 220 for a system based on sub-word units, where the shown word is modeled by a sequence of three sub-word models (250, 260 and 270), each with a sequence of four acoustic references (251, 252, 253, 254; 261 to 264; 271 to 274). The word models shown in FIG. 2 are based on Hidden Markov Models (HMMs), which are widely used to stochastically model speech signals. Using this model, each recognition unit (word model or subword model) is typically characterized by an HMM, whose parameters are estimated from a training set of data. For large vocabulary speech recognition systems usually a limited set of, for instance 40, sub-word units is used, since it would require a lot of training data to adequately train an HMM for larger units. An HMM state corresponds to an acoustic reference. Various techniques are known for modeling a reference, including discrete or continuous probability densities. Each sequence of acoustic references which relate to one specific utterance is also referred as an acoustic transcription of the utterance. It will be appreciated that if other recognition techniques than HMMs are used, details of the acoustic transcription will be different.

A word level matching system 130 of FIG. 1 matches the observation vectors against all sequences of speech recognition units and provides the likelihoods of a match between the vector and a sequence. If sub-word units are used, constraints can be placed on the matching by using the lexicon 134 to limit the possible sequence of sub-word units to sequences in the lexicon 134. This reduces the outcome to possible sequences of words.

Furthermore, a sentence level matching system 140 may be used which, based on a language model (LM), places further constraints on the matching so that the paths investigated are those corresponding to word sequences which are proper sequences as specified by the language model. As such the language model provides the second term P(W) of equation (1). Combining the results of the acoustic model with those of the language model, results in an outcome of the unit matching subsystem 120 which is a recognized sentence (RS) 152. The language model used in pattern recognition may include syntactical and/or semantical constraints 142 of the language and the recognition task. A language model based on syntactical constraints is usually referred to as a grammar 144. The grammar 144 used by the language model provides the probability of a word sequence $W=w_1w_2w_3 \ldots w_q$, which in principle is given by:

$$P(W)=P(w_1)P(w_2|w_1).P(w_3|w_1w_2) \ldots P(w_q|w_1w_2w_3 \ldots w_q)$$

Since in practice it is infeasible to reliably estimate the conditional word probabilities for all words and all sequence lengths in a given language, N-gram word models are widely used. In an N-gram model, the term $P(w_j|w_1w_2w_3 \ldots w_{j-1})$ is approximated by $P(w_j|w_{j-N+1} \ldots w_{j-1})$. In practice, bigrams or trigrams are used. In a trigram, the term $P(w_j|w_1w_2w_3 \ldots w_{j-1})$ is approximated by $P(w_j|w_{j-2}w_{j-1})$.

Figure 3:
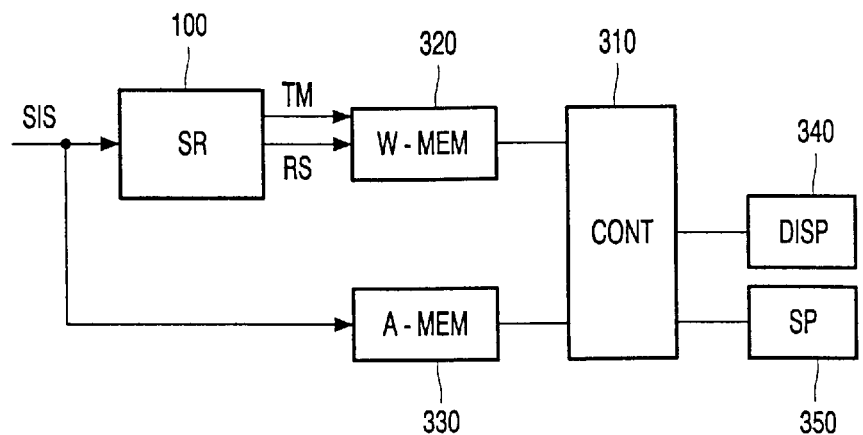
FIG. 3 shows a block diagram of a speech recognition system according to the invention.

FIG. 3 shows a block diagram of the system according to the invention. The system includes a speech recognizer, such as the system 100 described above with reference to FIGS. 1 and 2. Typically a large vocabulary continuous speech recognizer is used for the system according to the invention. The speech input signal (SIS) is fed into the speech recognizer. Normally, the speech is received in analog form via a microphone into a conventional audio card. The audio card samples the signal and converts it into a digital form. Alternatively, a digital microphone may be used, which feeds a digital speech signal directly into the system, for instance via USB. The digital representation of the speech is fed to the recognizer 100. According to the invention, a digital representation of the speech signal is also stored in a memory 330 for later reproduction during the synchronized playback/reproduction. It will be appreciated that the speech signal may be stored in any suitable form, such as a PCM sampled stream, or, preferably, a compressed form. Any compression technique suitable for compressing speech may be used. A dedicated memory 330 for storing speech may be used, including background storages. Preferably, a part of the conventional solid state memory (like RAM) is used, which is also used by the speech recognizer. The stream of recognized words (recognized sentence RS) generated by the speech recognizer 100 is also stored in a memory 320. This memory forms preferably also part of the main memory. During the recognition, the recognizer determines the most likely word sequence and as part of this process determines the boundaries in the speech signal where those words begin and end. In itself, any suitable technique for determining the word boundaries may be used. A frequently used technique is based on backtracking to determine the most likely (sub-)word sequence. Such backtracking may be based on the well-known Viterbi algorithm. In addition to the recognized words, the system stores for each word also an indication (marker) of the beginning and/or the end of the word with respect to the stored speech signal. Preferably, those markers are stored in the same memory 320 as used for storing the words.

Figure 4:
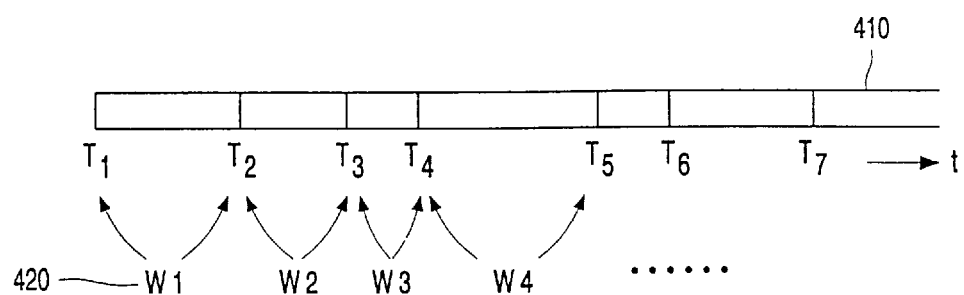
FIG. 4 illustrates an embodiment of using markers to indicate the correspondence between a word and a speech segment.

FIG. 4 shows that for each word w1, w2, w3, . . . of the sequence of words 420 the beginning and end of a corresponding segment of the speech signal 410 is known. The correspondence is preferably maintained by storing for each word a reference to a beginning and an ending of the corresponding speech segment. For instance, word w1 starts at T1 and ends at T2; w2 starts at T2 and ends at T3, etc. In itself the markers can be seen as points in time since the speech signal is a time-sequential signal. This implies that the markers can be expressed as time-points in the signal 410, starting from a reference time point. If the speech signal is stored as a sequence of samples, sampled at a fixed frequency, also a sample number can be used as a marker. Other suitable markers may also be used, depending on the way of sampling, coding and storing of the speech signal 410. It will be appreciated that since both the speech signal 410 and the word sequence 420 are time-sequential, it is in principle sufficient to store only one reference to a marker (either the begin or the end marker) for each word. For instance, assuming that playback starts at word w1 and that only begin markers are stored, it is required to check the next word in sequence (w2) to determine the begin marker T2 of w2. If then during playback, the time point T2 is passed, highlighting of w1 should be stopped and highlighting of T2 should be effected. For quick jumping between reproduction positions and simple processing it is preferred to store for each word both markers (or references to both markers). It will be appreciated that instead of storing for each word one or both markers, it is also possible to store for each marker identified in the speech signal 410 a reference to the word of the sequence 420 which starts (or ends) at that position. For instance, for marker T1 a reference (such as a pointer) is stored to word w1, for T2 a reference to w2, etc.

Referring to FIG. 3, the system also includes a controller 310 that controls the synchronous reproduction. Since normally the speech recognizer 100 is also implemented in software, it is preferred that the controller 310 performs the functions of the speech recognizer 100. During the synchronous reproduction, the controller 310 ensures that the highlighting on a display 340 and the audible reproduction is synchronous. Any suitable means may be used for the audible reproduction. If an audio card was used to receive the speech via a microphone from the user, preferably the same audio card is used for reproducing the speech via loudspeakers 350. Also digital speakers 350 may be used, for instance connected to the system via USB.

According to the invention, the controller 310 is operative to cause a synchronous reproduction of an audible and visible representation of the sequence of recognized words. Normally, the user dictates a relatively large part of text, such as one or more paragraphs. Having completed the dictation, the user reviews the recognition result. The dictation and recognition may have been 'real-time', e.g. by the user dictating directly into a word-processing or editing program, where a speech recognition program converts the speech into text. In this case, the reviewing user is normally the same as the user who performed the original dictation. It is also possible that the dictated speech was recorded 'off-line' (e.g. into a high-quality memo-recorder) and was fed into the speech recognizer at a later stage. In this case, the reviewing user may very well be another user, like a secretary. Normally the reviewing user can select at which position in the text the synchronous reproduction starts. This reproduction may involve all speech (and consequently all recognized words), but may also cover only a selected part of it. As part of the synchronous reproduction, the involved part of the speech signal stored in memory 330 is played-back. The markers stored in memory 320 identify the sequence of segments which have been identified in the speech signal, where each segment relates to a recognized word. Whenever a next segment is being played-back, the textual representation of the word recognized for that segment is indicated on the display. The correspondence between the respective words and the respective speech segments is given by the markers stored in the memory 320.

Normally, initially a window on the display is filled with the recognized text. In such a case, the recognized word corresponding to the speech segment can be indicated by highlighting the word on the screen. As such, the highlighting 'follows' the play-back of the speech. In some applications, the available display area may not be sufficient to display a large area of recognized text. This may, for instance be the case, where the dictation is recognized on a mobile device, such as a PDA, advanced mobile phone, or mobile device for accessing Internet. In such a case, the text may also 'slide' through a display area where the indicated text is the word at a specific position in the area, such as the center of the area.

In most situations, the speech is played-back at the same rate as it was recorded. If desired, also a slow-down or increase of the play-back rate may be selectable by the user. Techniques well-known from speech synthesis may be used to ensure that the quality of the speech reproduction does not degrade too much if the play-back rate differs from the recording rate.

The controller 310 allows the reviewing user to correct the recognized text. Preferably, the user may perform editing operations as normally provided by word processing systems. In addition, voice input for the editing is preferably possible. This may involve voice commands, e.g. to select text, change a format of text, etc. It may also involve dictating new words. A new word may be inserted in the text. It may also replace a selected text fragment. In itself techniques for editing, voice controlled editing and dictation are well known.

According to the invention, the controller 310 is operative to detect whether the user has provided an editing instruction, while the synchronous reproduction is active. Normally, the operating system, under which the software of the controller runs, supports 'intercepting' the input from the user and detecting certain inputs and acting on it. If the controller detects such an editing instruction, it pauses the synchronous reproduction, and causes the editing instruction to be performed (e.g. by sending the instruction on to a word processing system). The editing instructions of the user may be received via any suitable form of input, including the keyboard, the mouse, or via voice.

In a preferred embodiment, the controller 310 is operative to detect when a user has finished editing. Preferably, the controller 310 uses a time-out mechanism to detect this. A timer is started at the moment of pausing the synchronous reproduction. Each time the controller 310 detects an editing operation (e.g., via the keyboard, mouse or voice), the timer is restarted as long as the timer has not expired yet. At the expiration of the timer, the controller 310 ensures that the synchronous reproduction is restarted. Preferably, the user can configure the time-out value. For instance, by specifying the time within a predetermined range such as 100 ms. to 2 seconds. The user may also be offered a choice from a limited number of options, such as quick, medium or slow restart.

Preferably, the controller stores the location, such as an indication of the word, which was reached during the reproduction at the moment of pausing. This enables the controller to restart the paused synchronous reproduction at that word or at the word immediately following.

Advantageously, the controller detects which word or words has/have been edited during the pausing. It is generally known from editing systems how this can be detected. Having detected which words have been edited enables the controller to restart the reproduction immediately after the edited word(s). Since the user has already added new words or corrected wrongly recognized words, it is not preferred to start the synchronous reproduction with the already edited part of the text.

Preferably, the controller is operative to detect, during synchronous reproduction, that the user has indicated on the display a position different from the currently reproduced word. For instance, the user has positioned a mouse-controlled cursor in or before a different word. If the controller detects this, it causes the synchronous reproduction with a word corresponding to the position indicated by the user. It will be appreciated that if the user has located a cursor in between words (e.g. near a punctuation mark), the reproduction is preferably continued with the first word following that position.

Preferably, the controller also starts a timer at the moment the pause starts to determine how long the pause has lasted. If the pause lasts relatively long (e.g. several seconds), with more or less continuous editing input from the user, it is assumed that in fact the user is no longer correcting the recognized text, but is effectively entering new text. In that case it is no longer desired, that a pause in the input from the user results in restarting the synchronous reproduction. Instead, the synchronous reproduction mode is exited, and the dictation mode (optimized for entering new data) is started.

Normally the speech recognition system is implemented on a conventional computer, such as a PC or workstation. Increasingly, also portable equipment, such as PDAs, laptops or even telephones, are equipped with speech recognition. The functionality described by the invention is typically executed using the processor of the device, using conventional hardware, such as an audio card, for converting an analogue microphone signal into a digital data stream. If required also optimized hardware, such as DSPs, may be used for performing the speech recognition. The processor, such as a PC-type processor, micro-controller or DSP-like processor, can be loaded with a program to perform the steps according to the invention. This computer program product is usually loaded from a background storage, such as a harddisk or ROM. The computer program product can initially be stored in the background storage after having been distributed on a storage medium, like a CD-ROM, or via a network, like the public Internet.

What is claimed is:

1. A speech recognition system comprising:

an input device for receiving a speech representative signal;

a first memory for storing a representation of the received signal suitable for audible reproduction;

a speech recognizer operative to represent the received signal as a sequence of recognized words;

a second memory for storing the sequence of recognized words, with each recognized word being stored in association with a marker indicating a correspondence between the word and a segment of the received signal in which the word was recognized; and a controller operative to:

generate a synchronous reproduction of an audible and visible representation of at least part of the sequence of recognized words to enable a user to visually review the part of the sequence of recognized words in conjunction with audio play-back of the received signal corresponding to the part of the sequence of recognized words, the synchronous reproduction including audibly reproducing a corresponding part of the received signal stored in the first memory and for each segment of the corresponding part of the received signal, at the moment when the segment is being audibly reproduced, indicating on a display a textual representation of a recognized word which corresponds to the segment, the correspondence being given by the markers stored in the second memory;

detect whether the user has provided an editing instruction while the synchronous reproduction is active and the part of the sequence of recognized words is being audibly and visually reproduced;

pause the synchronous reproduction in response to detection of an editing instruction during the synchronous reproduction; and cause the deleted editing instruction to be performed during the pause in the synchronous reproduction.

2. A system as claimed in claim 1, wherein the controller is further operative to:

detect when a user has finished editing during the pause in the synchronous reproduction; and automatically restart the synchronous reproduction in response to the detection that the user has finished editing.

3. A system as claimed in claim 2, wherein the controller is further operative to automatically restart a paused synchronous reproduction in response to the absence of received input from the user for a predetermined time-out period.

4. A system as claimed in claim 3, wherein the controller is further operative to enable a user to configure the predetermined time-out period.

5. A system as claimed in claim 2, wherein the controller is further operative to automatically restart a paused synchronous reproduction at a word that was being reproduced at the moment the synchronous reproduction was paused.

6. A system as claimed in claim 2, wherein the controller is further operative to automatically restart a paused synchronous reproduction at a word which in the sequence of recognized words immediately follows a word that has been edited last by the user.

7. A system as claimed in claim 2, wherein the controller is further operative to, during synchronous reproduction:

detect that the user has indicated on the display a position different from a position of a word being indicated during the synchronous reproduction at that moment; and continue the synchronous reproduction with a word corresponding to the position indicated by the user.

8. A system as claimed in claim 3, wherein the controller is further operative to:

detect that, while the synchronous reproduction is paused, the user has supplied editing instructions for more than a predetermined period without an interruption of more than the time-out period; and enter a dictation mode upon detection of the editing instructions for more than the predetermined period without an interruption of more than the time-out period.

9. A method of enabling reviewing a sequence of words recognized by a speech recognizer in a speech representative input signal, the method including:

storing a representation of the received signal suitable for audible reproduction;

using a speech recognizer to represent the received signal as a sequence of recognized words;

storing the sequence of recognized words, with each recognized word being stored in association with a marker indicating a correspondence between the word and a segment of the received signal in which the word was recognized;

generating a synchronous reproduction of an audible and visible representation of at least part of the sequence of recognized words to enable a user to visually review the part of the sequence of recognized words in conjunction with audio play-back of the received signal corresponding to the part of the sequence of recognized words, the synchronous reproduction including audibly reproducing a corresponding part of the received signal stored in the first memory and for each segment of the corresponding part of the received signal, at the moment when the segment is being audibly reproduced, indicating on a display a textual representation of a recognized word which corresponds to the segment, the correspondence being given by the markers stored in the second memory;

detecting whether the user has provided an editing instruction while the synchronous reproduction is active and the part of the sequence of recognized words is being audibly and visually reproduced; and pausing the synchronous reproduction in response to detection of an editing instruction during the synchronous reproduction; and causing the detected editing instruction to be performed during the pause in the synchronous reproduction.

10. A computer program product where the program product is operative to cause a computer to perform the method of claim 9.

11. A system as claimed in claim 1, wherein the controller is further operative to indicate on the display the textual representation of the recognized word which corresponds to the segment by highlighting the textual representation.

12. A system as claimed in claim 1, wherein the input device includes an audio card and a microphone connected to the audio card.

13. A system as claimed in claim 12, further comprising an output device coupled to and controlled by the controller to audibly reproduce the received signal, the output device being coupled to the audio card.

14. A system as claimed in claim 1, further comprising an output device coupled to and controlled by the controller to audibly reproduce the received signal.

15. A system as claimed in claim 14, wherein the output device is at least one speaker.

16. A system as claimed in claim 1, wherein the controller is further operative to generate the synchronous reproduction of the audible and visible representation of the part of the sequence of recognized words after completion of the entire input of the speech representative signal.

17. A system as claimed in claim 1, wherein the input device is separate from the speech recognizer and the first memory is separate from the second memory such that the speech representative signal is recordable off-line and transferable into the speech recognizer at a later stage.

18. A system as claimed in claim 1, wherein the controller is further operative to enable a user to select a position in the sequence of recognized words at which the synchronous reproduction starts.

* * * * *